(12) United States Patent
Heimbach (10) Patent No.: US 7,779,645 B2
(45) Date of Patent: Aug. 24, 2010

(54) PET CRATE COOLER

(76) Inventor: Steve Heimbach, 8655 Swan Rd., Colorado Springs, CO (US) 80908

( * ) Notice: Subject to any disclaimer, the term of this patent is extended or adjusted under 35 U.S.C. 154(b) by 193 days.

(21) Appl. No.: 11/835,373

(22) Filed: Aug. 7, 2007

(65) Prior Publication Data

US 2009/0038332 A1 Feb. 12, 2009

(51) Int. Cl.
F25D 3/02 (2006.01)
(52) U.S. Cl. .................................................. 62/420
(58) Field of Classification Search ............ 62/420, 62/421; 222/189; 119/72.5
See application file for complete search history.

(56) References Cited

U.S. PATENT DOCUMENTS

| | | | |
|---|---|---|---|
| 2,841,964 A * | 7/1958 | Anderson | ............... 62/426 |
| 3,175,534 A * | 3/1965 | Pollard | ............... 119/174 |
| 4,612,774 A | 9/1986 | Budreau | |
| 4,751,827 A | 6/1988 | Villarreal | |
| 4,860,556 A | 8/1989 | Hammett | |
| 5,046,329 A | 9/1991 | Travis, III | |
| 5,186,020 A * | 2/1993 | Rockenfeller et al. | ...... 62/457.9 |
| 5,245,951 A * | 9/1993 | Nicholson | ............. 119/72.5 |
| D364,452 S | 11/1995 | Wiggins | |
| 5,553,662 A * | 9/1996 | Longardner et al. | ...... 165/202 |
| 5,727,503 A | 3/1998 | Whittaker | |
| 5,737,938 A | 4/1998 | Liu | |
| 5,860,293 A | 1/1999 | Piro | |
| 6,192,702 B1 | 2/2001 | Shimogori | |
| 6,490,995 B2 | 12/2002 | Greene, Jr. | |
| 7,444,825 B2 * | 11/2008 | Miller et al. | .................. 62/255 |
| 2005/0150251 A1 | 7/2005 | Navedo et al. | |
| 2006/0070396 A1 | 4/2006 | Glover | |

* cited by examiner

*Primary Examiner*—Melvin Jones
(74) *Attorney, Agent, or Firm*—Leyendecker & Lemire, LLC; Kurt P. Leyendecker (57) ABSTRACT

A pet crate cooler comprising a tub adapted to hold ice, a plurality of tubes or fins adapted to receive melted ice water from the tub, and a fan adapted to blow air across the outer surface of the fins or tubes and into the pet crate cavity.

19 Claims, 7 Drawing Sheets

PET CRATE COOLER

FIELD OF THE INVENTION

This invention generally relates to cooling devices adapted to lower the temperature of pet crates and other small enclosures.

BACKGROUND

Pets crates are commonly used in the pet industry to confine pets to a small area. Some pet crates may be used at home for training or at confirmation shows. Conformation shows may also be referred to as dog shows or breed shows. In a conformation show, judges familiar with specific dog breeds evaluate individual dogs for how well they conform to a breed standard—typically set by a national kennel club. Dog shows take place all year long and in various locations. Some shows are small, local shows, while others draw competitors from all around the country or the world.

High temperatures in small enclosures such as, but not limited to, the pet crates used in these dog shows, are often a problem for the pets or other materials within the enclosure cavity. High temperatures frequently occur in the summer months when temperatures are at their peak and pet shows are often held in outdoor arenas, but the high temperatures may occur at other times of the year as well—especially if the small enclosure or pet crate is left in the sun or in an overly heated room without proper ventilation. To combat such heat and attempt to lower temperatures within pet crates, many of these enclosures and pet crates include openings such as a wire mesh window or door. These openings help to circulate the air and allow for cooler air to enter the crate. By allowing air circulation, these openings provide some relief to the contents of the enclosure, and a fan is often hung on the wire mesh door or window to help increase the air circulation.

These prior art pet crate fans, as well as other types of pet crate coolers, are deficient in many aspects. For instance, some prior art pet crate coolers are built into the pet crate and are not adapted to be used with standard pet crates currently on the market that do not have a cooler built-in. Additionally, many of the crates having built-in coolers are heavy, large, expensive, and/or may not properly cool the enclosure under all circumstances (such as when no electric power supply is available). Therefore, these pet crates are not a viable option for many people. Likewise, simple fan coolers often circulate warm air and do not lower the temperature at all. The lack of a portable system that is adapted to cool standard pet crates causes many problems during summer dog and animal shows as pets are often required to be kept in outdoor overheated crates in-between performances.

DETAILED DESCRIPTION

In order to overcome problems with the prior art, namely, that there are no affordable cooling systems for pet crates and small enclosures that are easily portable, also adaptable for use on existing pet crates, and inexpensive, a pet crate cooling device (referred to as a pet crate cooler), has been developed. In one embodiment, the pet crate cooler is comprised of a device adapted to receive and contain cold water or another cold or cool liquid. An embodiment may be adapted so the water to cools at least a portion of the outer surface of the device. One embodiment may include a fan adapted to blow air across the cool surface of the device and into a pet crate, or other enclosure, cavity. In such a device the internal pet crate air—heated, warm, and stagnant, may thereby be replaced cool, fresh air.

One embodiment of the pet crate cooling device may be comprised of a tub and of tubes. Tubular fins may be also used, and unless noted otherwise, generally the same functionality occurs with a fin embodiment as occurs with tube embodiments having different cross sections. The tubes may be generally vertically aligned in an array, and the tub may be positioned at an open, upper end of each of the tubes. One set of tubes may have a general bullet-shaped cross section. One fin version may not have an array of fins, but may have fins aligned generally in a single row. The tub may be an upper tub comprised of a tub bottom and one or more tub walls. One tub version has a plurality of bores in the tub bottom adapted to align with the upper open ends of the tube array or the fins. The bores may have a shape generally similar to the shape of the tubes or fins. Additionally, in a tube embodiment, a center portion of each tube may be a coiled, or flanged, tube portion. One coiled or flanged portion may allow for greater tube surface area and in a fin version, the fins may allow for a greater surface area to contact the air as the air blows into the pet crate cavity. With a larger surface area in one embodiment, the air flowing over the tubes may obtain a lower temperature prior to entering the crate.

In one method of cooling a pet crate, upon cold water being placed within the tubes of a tube version, a user ensures that the coiled or flanged potion of each tube is filled. Ice may then be placed in the upper tub and the device may be hung on a wire-frame door of a pet crate, with a fan coupled to the tubes' or fins' outer surface. Upon the ice melting, the cold water filters through the bores on the upper tub bottom and into the tubes or fins. Therefore, as the melting ice mixes with the liquid in the tubes or fins, through convection in one embodiment, the temperature of the liquid in the tubes or fins is lowered and kept cold. The lower water temperature in the fins or tubes lowers the temperature of the tube/fin skin, or outer surface. As the fan is powered on and air is blown around the colder tubes and fins, the temperature of the air blown into the crate is lowered. Therefore, by using a pet crate cooler with fins or tubes, the temperature of the cavity in the dog crate or other small enclosure may be a reasonable temperature such that the occupants or contents of the crate or enclosure will be cooler than the ambient air temperature outside the pet crate enclosure.

With one such pet crate cooling device or method of cooling a pet crate, a pet crate may be generally continually kept at a reasonable temperature for a pet, as the water in the upper tub may be removed upon the ice melting. The upper tub may then be refilled with more ice or with cold water, and the tub-fin/tube liquid mixture process described above may be repeated, keeping the tube/fin liquid, and thereby the outer surface or skin, cold. Additionally, since the device may couple to a pet crate door, such a device can be used on many existing pet crates, thereby allowing current pet owners to transport and keep their pets in their existing crates at a reasonable temperature. No longer is there need to purchase a specially-designed (and expensively designed) air-conditioned pet crate to take to outdoor summertime pet shows. With such a pet crate cooler, the temperature of the dog crate cavity may be lowered below the temperature of the crate if only a fan were used to lower the crate temperature.

Terminology:

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

Figures 1, 2:
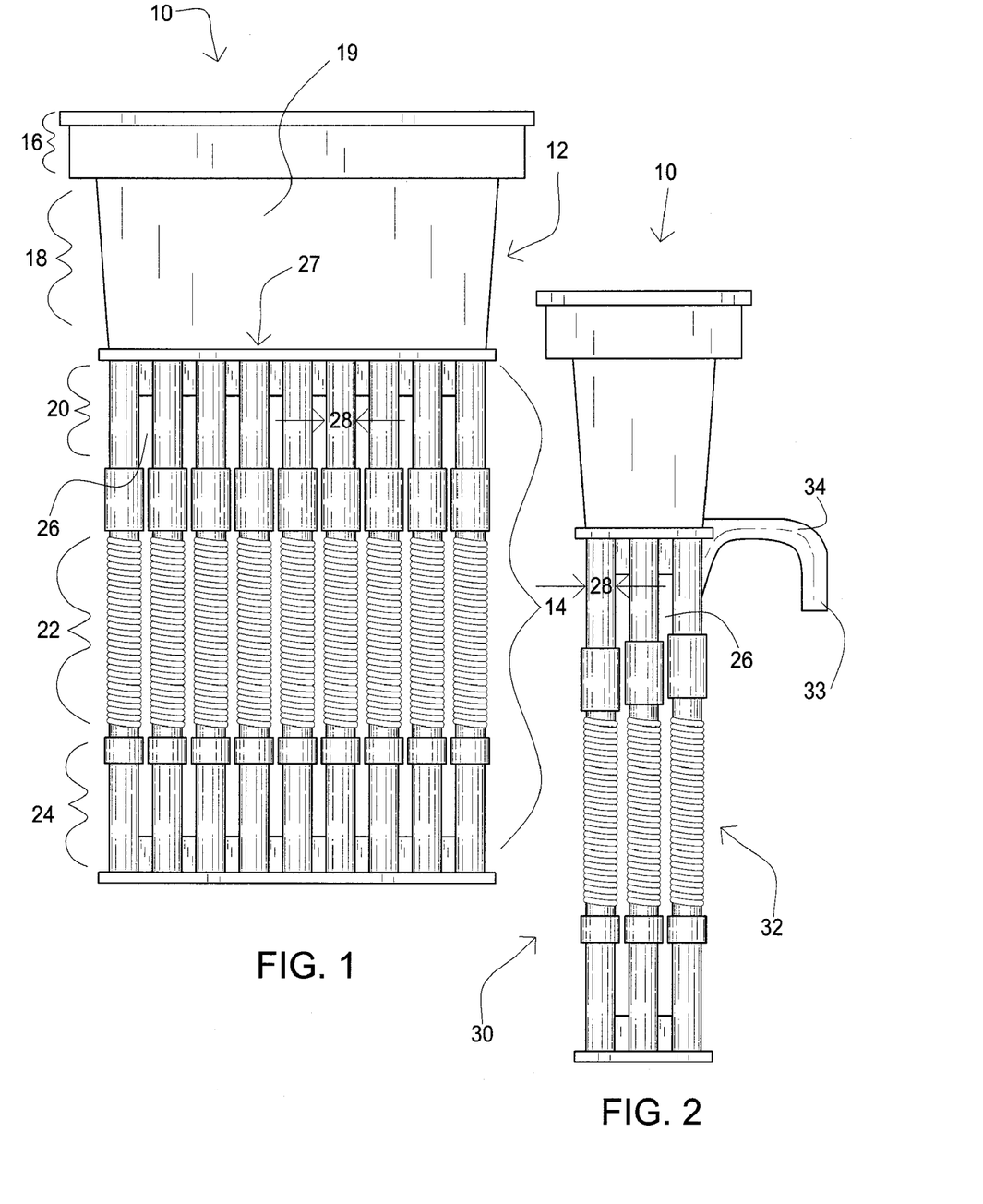
FIG. 1 is a front view of a pet crate cooler according to one embodiment of the invention.
FIG. 2 is a side view of a pet crate cooler according to one embodiment of the invention.
Figure 3:
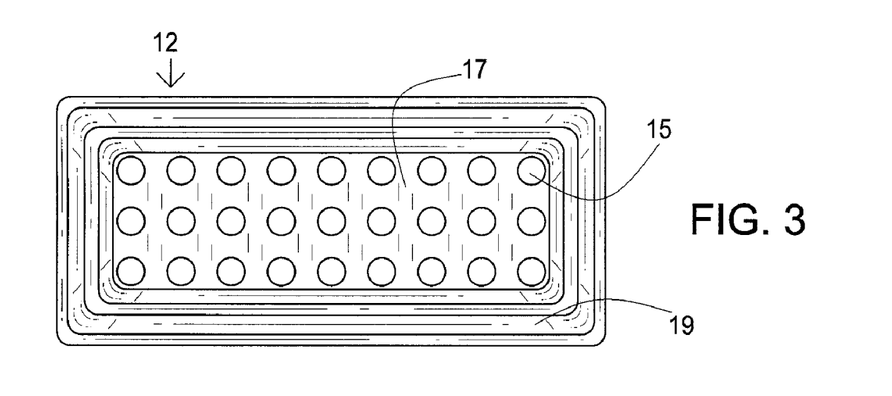
FIG. 3 is a top view of a pet crate cooler looking into the tub and coupled tubes according to one embodiment of the invention.

A First Version of a Pet Crate Cooler:

As best shown in FIGS. 1 through 3, one pet crate cooler 10 may be comprised of a tub 12 and a plurality of tubes 14. The tub may be comprised of a polymeric material such as, but not limited to, polyvinyl chloride, polyethylene, or polypropylene. Other polymers and non-polymeric materials are also contemplated. One tub may have a generally tapered lengthwise and width-wise cross-section, with a tub top portion 16 comprising a generally wider and longer tub than a tub bottom portion 18.

As best shown in FIG. 3, one tub 12 may be comprised of one or more sides 19 and a bottom 17. The bottom in one embodiment may also be comprised of a plurality of bores 15. The tub in one embodiment may be adapted to hold ice. Upon the ice melting, the tub may funnel the water through the bores. The tub may also be adapted to hold other solids such as, but not limited to, ice packs. Additionally, the tub may hold only a liquid, such as water, or a liquid and a solid, such as water and ice.

Each tub bore 15 may have a center axis that is substantially aligned with the longitudinal axis of a tube 14. One bore may have a diameter preferably from ½ inch to 1.5 inches, more preferably from ¾ inches to 1.25 inches, and most preferably of about 1 inch. Upon a bore receiving water from the melted ice, the water travels through the bore and into the tube, mixing with the water in the tubes, thereby cooling the water in the tubes to a lower temperature.

The tubes 14 may be generally cylindrical tubes comprised of an upper portion 20, a center portion 22, and a lower portion 24. Although the tubes may have a generally circular cross-section, one tube cross-section may have a generally rectangular cross-section, or may have another cross-sectional design. The upper end 27 of the upper portion of each tube may be an open end and the lower end 25 of each tube lower portion may be a closed end. The upper portion and lower portion may have a generally smooth surface, while the center portion may have a plurality of flanges on the surface. The center portion may also be referred to as a coil section or portion as one center portion may not have flanges, as best shown in FIG. 2, but have a generally coiled center portion.

The center portion 22 may be coiled or have flanges in order to increase the surface area of the tube 14 since, in one embodiment, the majority of the air which travels around the tubes and subsequently into the crate travels around the tube center portion. Therefore, with a larger center portion surface area than the surface area of the top portion or the bottom portion, the air temperature should decrease more substantially when blowing across the coiled section than if the air were to blow across an unflanged or uncoiled upper portion or lower portion. In one embodiment, there may be 27 tubes generally aligned in a 9×3 array.

In one embodiment, the pet crate cooler 10 may be further comprised of a pet crate coupling mechanism. One pet crate coupling mechanism may be referred to as a pet crate coupler and one pet crate coupler may be a hook 34. The pet crate coupling mechanism may be a clasp or other attachment device as well. The pet crate coupling mechanism may be adapted to allow the pet crate cooler to couple to a pet crate section such as, but not limited to, a wire mesh door. For example, the hook may simply slide through the wire door and rest upon a horizontally-aligned wire, with a hook vertical portion 33 keeping the cooler coupled to the door. For example, the vertical portion may be pulled forward and against a horizontal bar in one embodiment by the weight of the cooler & fan.

Upon hanging the pet crate cooler 10 on the pet crate 52, one portion of the tube array may face outwardly from the crate. The tube array side facing away from the pet crate may be termed a tube array outer side 30 and the tube array side facing inwardly towards the pet crate may be termed the tube array inner side 32. The crate coupling mechanism, as best shown in FIG. 2, may be a hook 34 and may be coupled or integrated to the inner side.

Figure 4:
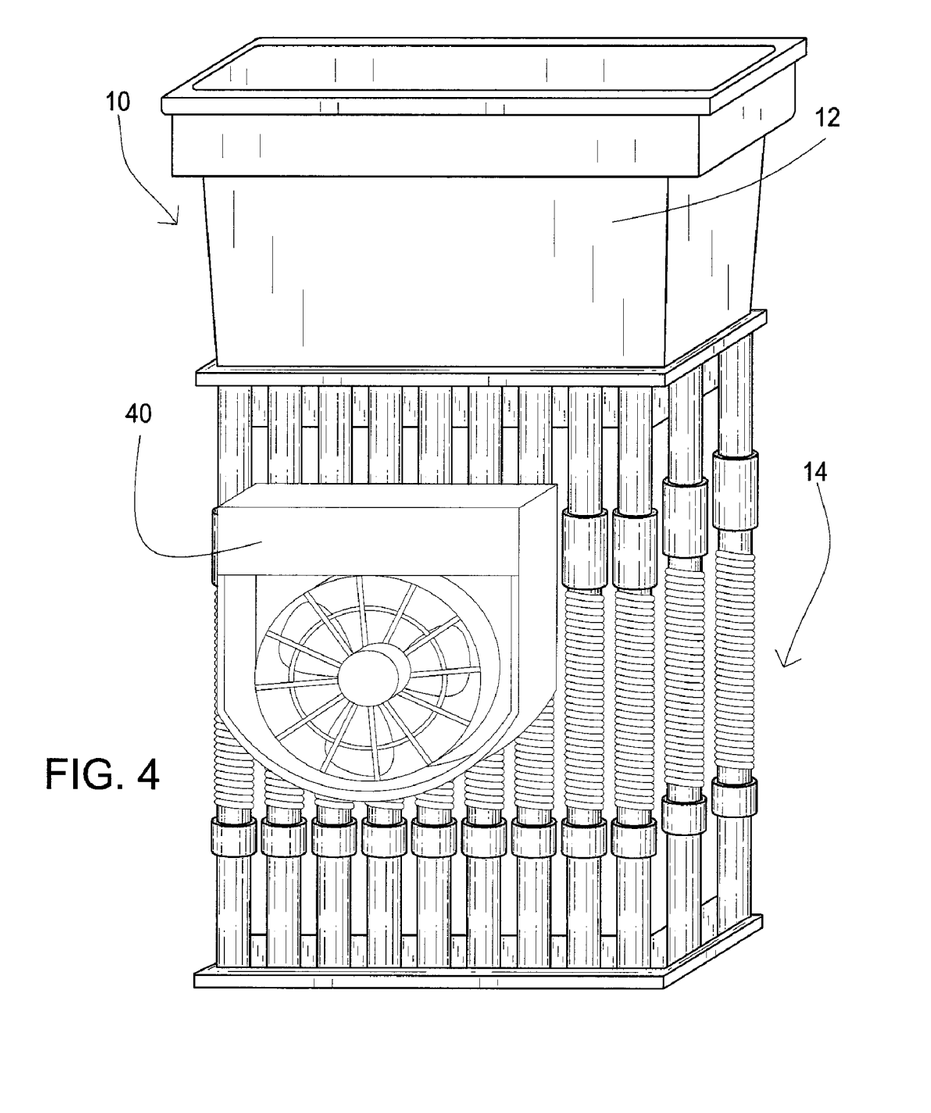
FIG. 4 is an isometric view of a pet crate cooler with a coupled fan according to one embodiment of the invention.
Figure 5:
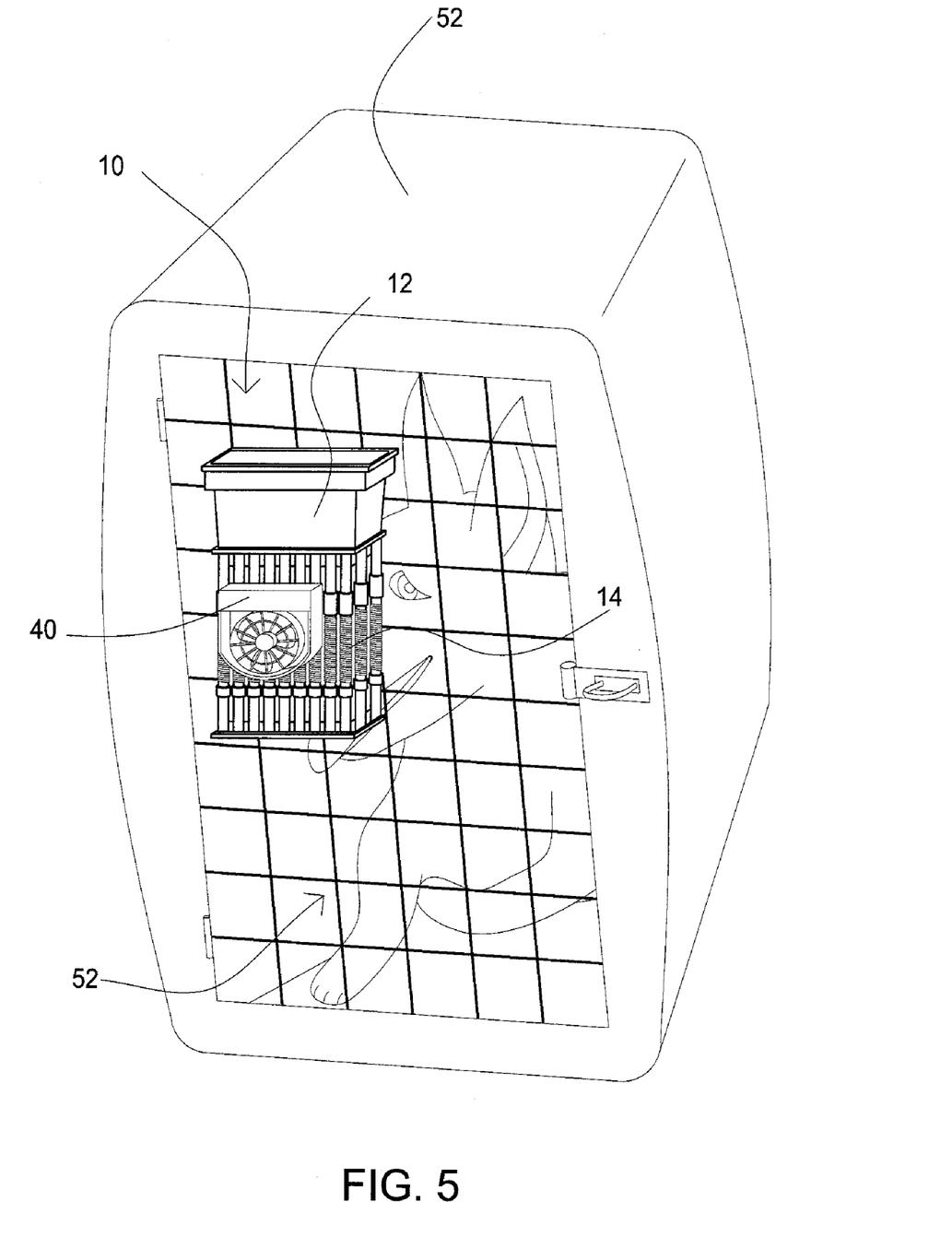
FIG. 5 is an isometric view of a pet crate cooler and fan coupled to a pet crate according to one embodiment of the invention.

One pet crate cooler 10 is also comprised of a fan 40, as best shown in FIG. 4. One fan may be a battery-powered fan adapted to couple to the tube array outer side 30. Similar to the pet crate cooler coupling mechanism, one fan may also hook to a pet crate cooler horizontal bar 99, with the horizontal bar best shown in FIG. 6. One fan may be positioned to move air from the tube array outer side 30, around the tubes 14, and past the tube array inner side 32. In one such embodiment, the fan is also adapted to, and appropriately positioned to, take air from a fan outer side 42 and move it to a fan inner side. The force of the fan in one embodiment is such that the air continues to move from the fan inner side to the tube array outer side, around the tube array and past the tube array inner side an into the pet crate cavity 50, as best shown in FIG. 5.

In one embodiment, the tub 12 is adapted to cool the temperature of the tubes 14. For example, as stated above, in one embodiment, as ice in the tub melts, the melted ice water may mix with the water in the tubes. The colder water in the tubes may therefore cool the tube surface. The air which flows across the tube surface may cool to about the tube array surface temperature and upon blowing into the cavity, cool the pet crate cavity to a temperature lower than if the ice water did not mix with the tube liquid.

An embodiment may also include other tub-tube cooling mechanisms. For example, one embodiment may be comprised of a tub 12 and tube array having a metallic material. In such an embodiment, the ice placed in the tub may not mix with the water in the tubes 14, or the tubes may not be comprised of water. However, if the tub and tubes are comprised of an integrated metallic surface, the ice in the tub will cool not only the tub, but the heat transfer properties of the metal will allow the tubes to cool as well. Other tub-tube cooling mechanisms are also contemplated.

In one tube array embodiment, the space 26 between the individual tubes 14 may be smaller than the diameter 28 of the tubes. For example, the tubes in one embodiment may be about 1 inch in diameter, and the space between the tubes may be about ¼ or ½ an inch. Such a design in one embodiment helps to cool the air more quickly than having spaces as large as or lager than, the diameter of the tubes.

Figure 6:
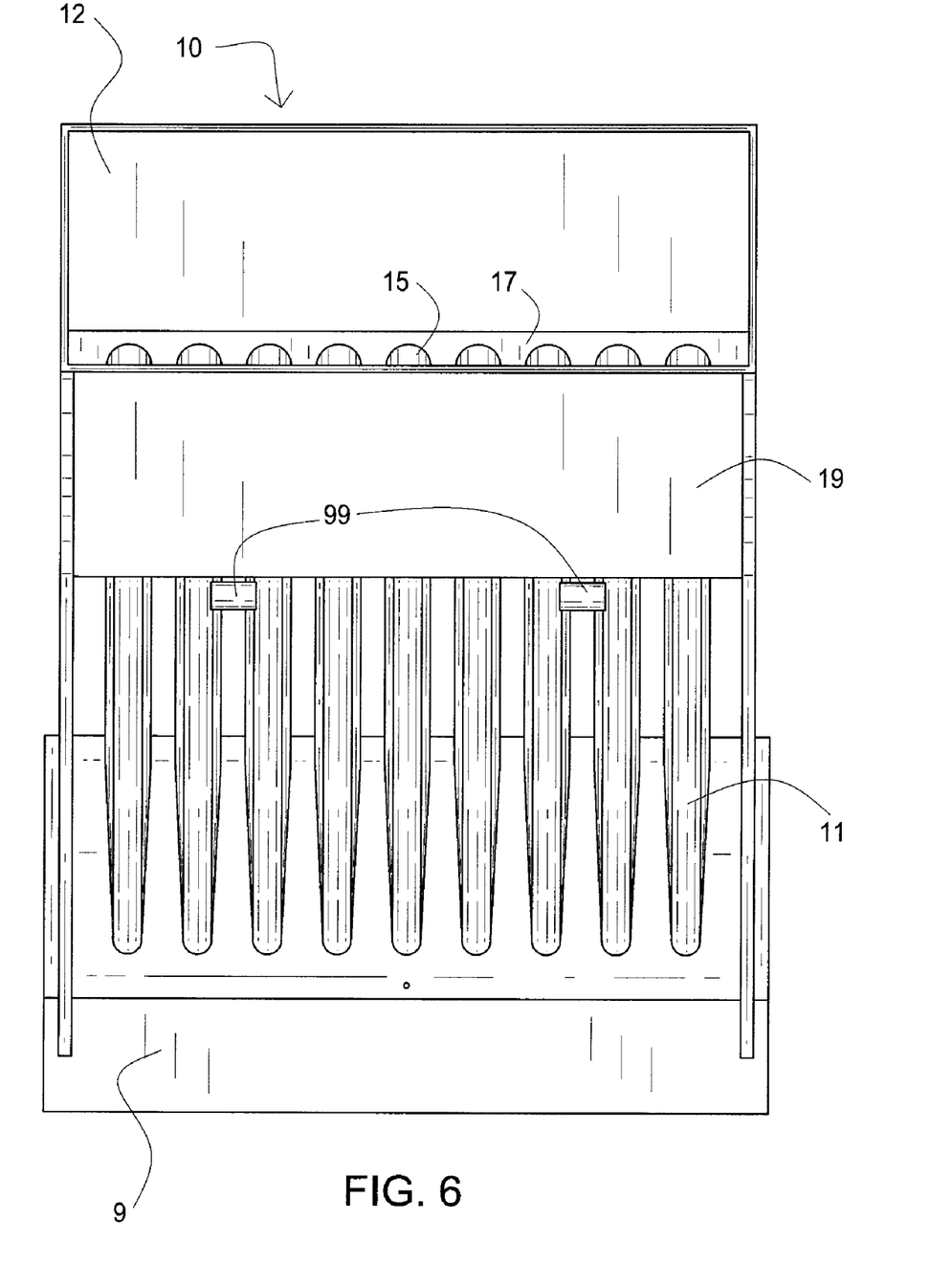
FIG. 6 is an isometric front view of a pet crate cooler having fins and a lower tub according to one embodiment of the invention.
Figure 7:
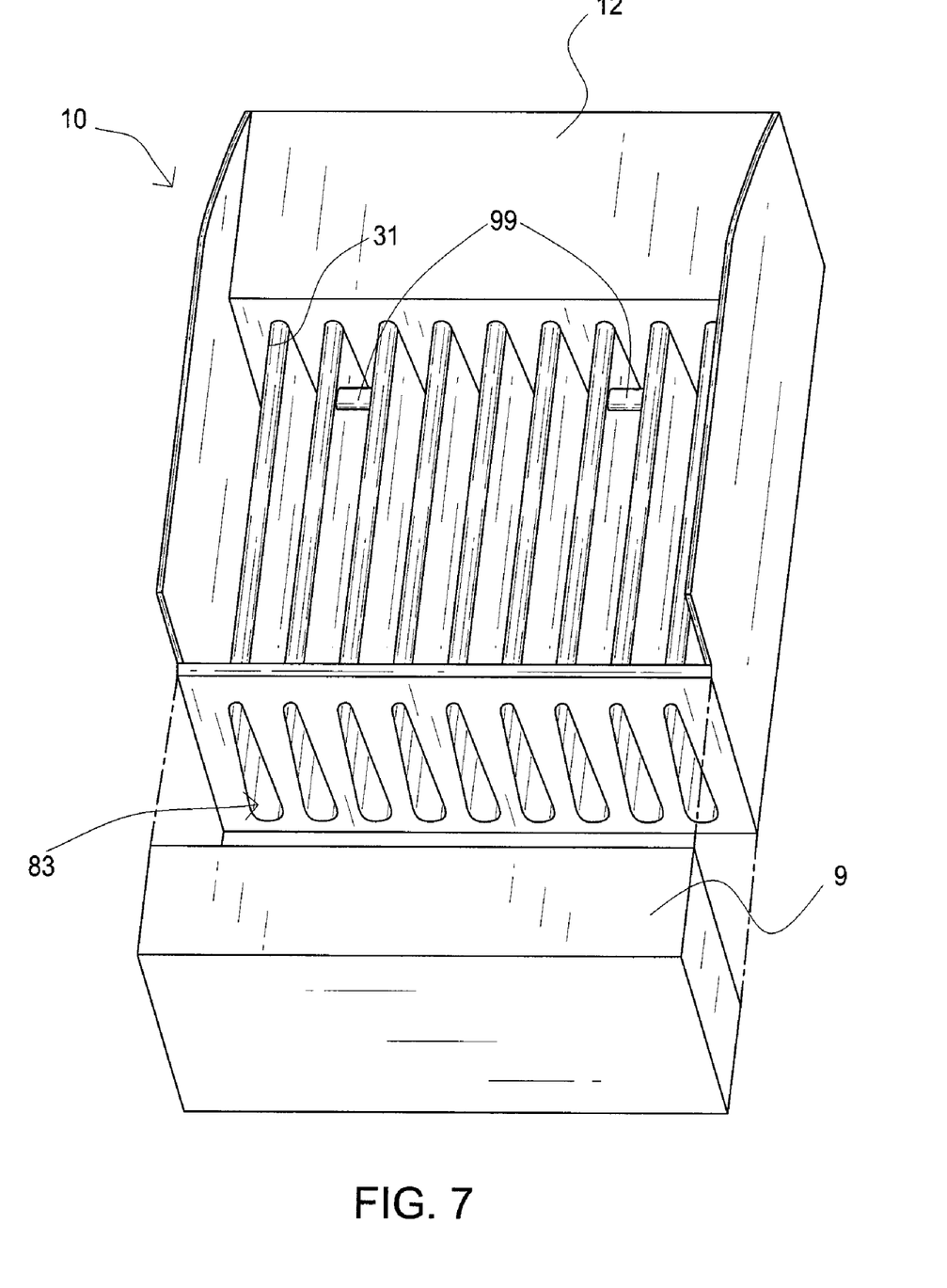
FIG. 7 is an isometric bottom view of a pet crate cooler having fins and an uncoupled lower tub, showing the fin lower end openings according to one embodiment of the invention.
Figure 8:
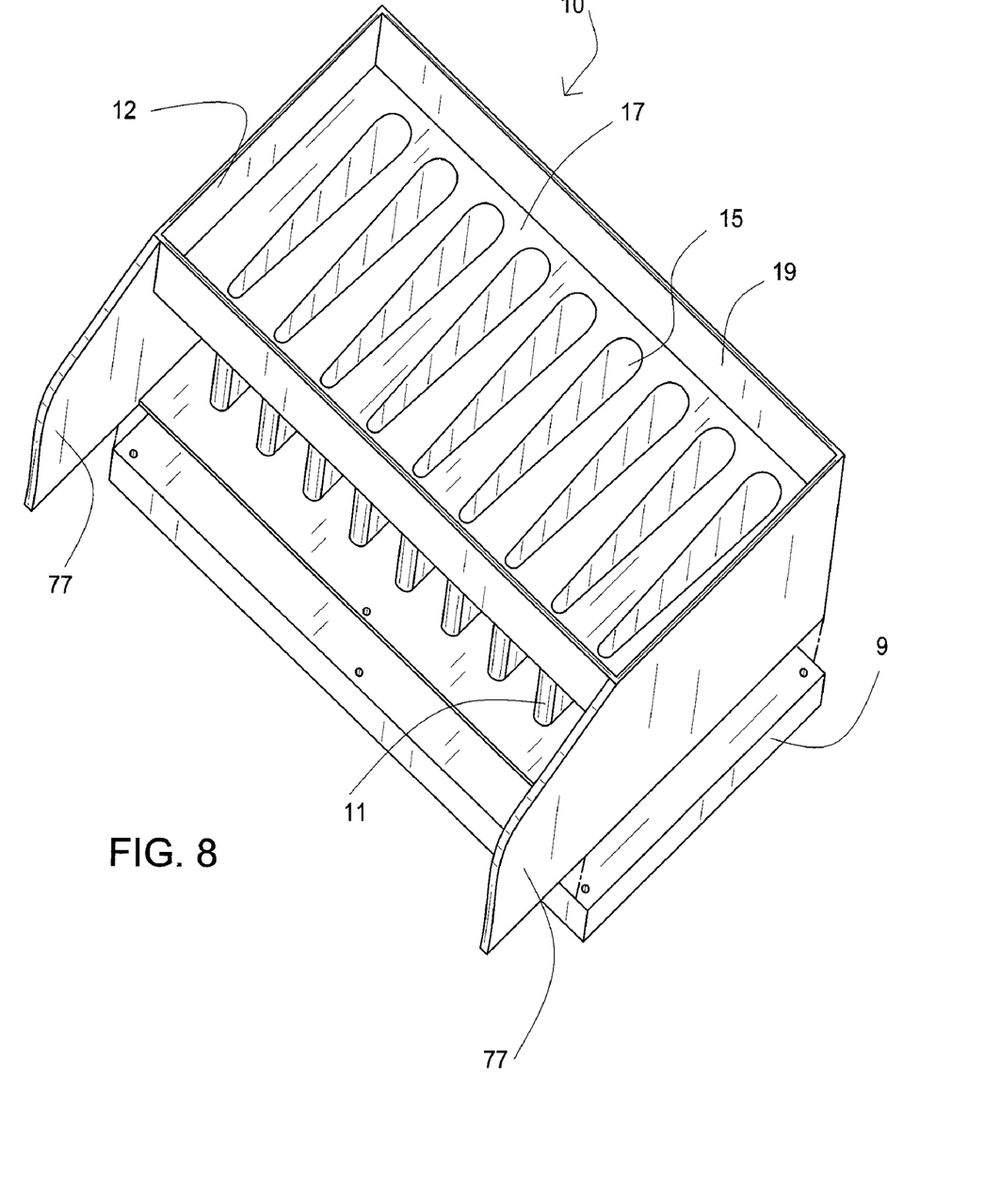
FIG. 8 is an isometric top view of a pet crate cooler having fins and an uncoupled lower tub, showing the fin upper end openings according to one embodiment of the invention.
Figure 9A:
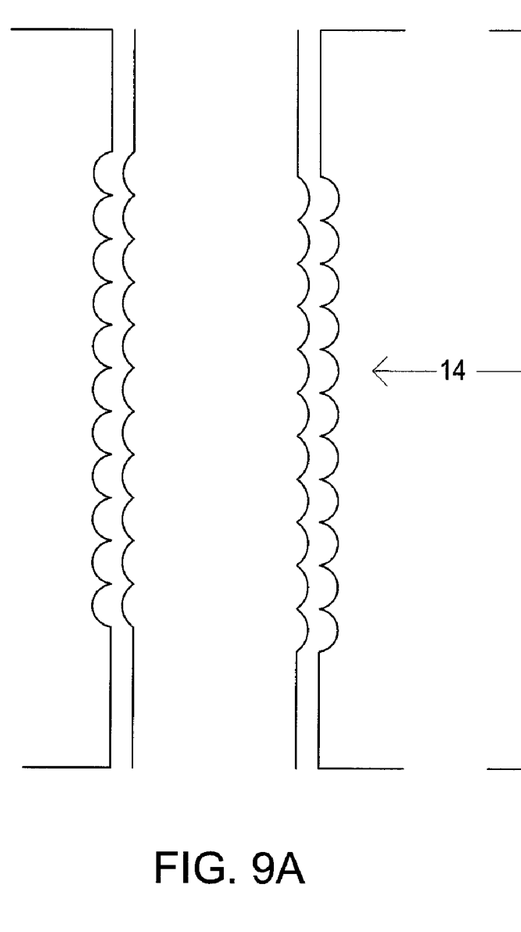
FIG. 9A is a cross-sectional view of a tube center section according to one embodiment of the invention.
Figure 9B:
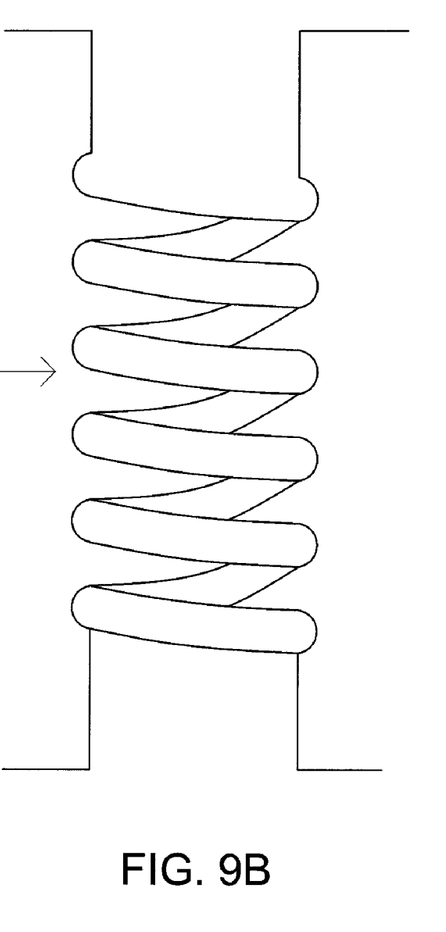
FIG. 9B is a front view of a tube center section according to one embodiment of the invention.

A Second Version of a Pet Crate Cooler:

As best shown in FIGS. 6 through 8, a second version of a pet crate cooler 10 is similar to a first version of a pet crate cooler described above and shown in FIGS. 1 through 3. Like the first version, the second version has a tub 12. In the second version, the tub may be an upper tub. The upper tub may be similar to the first version tub. For example, the upper tub may also have a tub bottom 17 and one or more tub walls 19 and a plurality bores 15 in the tub bottom. As best shown in FIG. 8, the bores may be fin-shaped to have a geometry which generally aligns with the cross-sectional geometry of the fins 11.

In one second version the fins 11 may be hollow fins with an open upper end and an open lower end. The fins may be adapted to receive a liquid from the tub 12 through the tub bores 15. One type of liquid that may be received by the fins is water and may be melted ice water. Therefore, through the ice melting and mixing with the water already in the fins, one upper tub may operatively cool the water in the fins and therefore, through heat transfer, cool the fins outer surface as well. The upper tub may operatively cool the fins in other ways as well. Additionally, although the vertically-aligned fins, like the tubes, may be aligned, the fins may not be generally aligned in an array, but may be sequentially aligned in a row, as best shown in FIG. 6.

The pet crate cooler 10 may also be comprised of a lower tub 9. One lower tub may couple to the fins 11 proximal a fin lower end. The lower tub may only be ¼ inch deep in one second version. However, deeper tubs an inch or more are also contemplated. Like a first version, a second version pet crate cooler may also use a fan, and may couple to a pet crate having a door with wire bars, keeping an animal inside. In one second version, the fan is adapted to blow air around the fins—from a fin narrow side 31 to a fin wide side 83. A fin wide side in one embodiment may have an outer diameter of about ¼ inch. The space between two fins may be about ¼ inch in one embodiment as well.

A second version may also be comprised of air direction barriers 77. Air direction barriers may be adapted to direct air blown from the fan towards the fins, and to decrease the amount of air bleed which blows around the pet crate cooler 10. A second version may also include horizontal bars 78. The horizontal bars may be adapted to allow a fan to rest upon the bars. A second version may also have a coupling mechanism similar to the hook 34 described in the first version and as best shown in FIG. 2. Lastly, the second version lower tub 9 may be comprised of a drain plug. The drain plug may be adapted to allow the plug to be removed to the water may be emptied out of the lower tub so that new, colder water can replace it. The drain plug in one embodiment may also be located on the upper tub.

One Method of Cooling a Pet Crate:

As best shown in FIGS. 4 and 5, one method of cooling a pet crate is comprised of using a pet crate cooling device 10. The pet crate cooling device may be comprised of a tub 12, a plurality of tubes 14, and a fan 40. As best shown in FIG. 8, a pet crate cooler comprising fins 11 and a lower tub 9 may also be used in one method. A method may include hanging the pet crate cooler on the door of a pet crate. For example, one type of pet crate may include a door having a metallic bars to keep the pet inside the pet crate, yet provide the pet inside with a reasonable amount of air circulation. The metallic bar door may also be referred to as a wire mesh door. With such a door, the pet crate cooler may have a coupling mechanism such as, but not limited to, a hook or a clasp, which my couple the pet crate cooler to one or more wire bars.

Upon coupling a pet crate cooler 10 to the pet crate 52, in one method, the plurality of tubes 14 or fins 11 are filled with a liquid. This may be done in one method by pouring water into the tub 12, where the tub may be an upper tub, with the water traveling through bores 15 located in a tub bottom 17 and into the tubes or fins which are longitudinally-aligned with the bores. Upon the tubes or fins becoming substantially filled with water or another suitable liquid, ice or another solid may be placed in the tub, where the tub may be an upper tub, and the fan may be turned on. One method may include using a solid such as, but not limited to, a coldpack or icepack.

In one method, hanging the pet crate cooler 10 on the pet crate door or other portal such as, but not limited to, a window, may include placing a hook (as best shown in FIG. 2) through the wire mesh and resting on a horizontal bar. In one method, the bars may not be comprised of metal, but may be comprised of a polymeric material or any other material. A method may also include melting the ice. The ice may be melted simply by subjecting the ice to an ambient outdoor in indoor temperature greater than 32 degrees Fahrenheit. This may be at or about room temperature, which may be about 72 degrees Fahrenheit.

When the ice in the tub 12 melts in one method, the melted ice water may mix with the liquid in the tubes 14 or fins 11. For example, the ice water may travel through the bores 15 and mix with the warmer tube liquid. Therefore, the melted ice water may cool the liquid in the tubes and fins. The method may then include using the fan to blow air from a tube or fin outer side 30, around the tubes and fins, to a tube or fin inner side 32, and into the pet crate 52. By lowering the temperature of the water in the tubes, in one method, the temperature of the surface or skin of the tubes or fins is also lowered. Therefore, the air that blows around the tubes or fins may also be lowered upon contact with the tube/fin outer surface, and upon blowing into the pet crate, the air may lower the temperature of the air within the pet crate. In one method, for the air to blow into the pet crate cavity 50, the pet crate door that the cooler is coupled to must be closed.

A method may include using a pet crate cooler 10 that has a detachable tub 12, where the tub may be an upper tub or the tub may be a lower tub 9. Such a method may include coupling the upper or lower tub to the pet crate cooler tubes. One method may couple the upper tub to the tubes by snappably coupling a tub bottom to the open tube upper end. The lower tub may be coupled to the lower tube or fin ends by snapping onto the fins. Additionally, a method may include emptying the water from the tub upon the ice melting and placing new ice or cold water into the upper tub. In one embodiment, the lower tub is comprised of a top surface which acts as a tube or fin bottom surface such that the tube or fin liquid does not mix with the lower tub liquid. The lower tub may be comprised of a small lip which may be adapted to receive condensation liquid from the tubes or fins, and collect the condensation liquid in the lower tub through openings in the lip.

Alternative Embodiments

The embodiments of the pet crate cooler and methods of use as illustrated in the accompanying figures and described above are merely exemplary and are not meant to limit the scope of the invention. It is to be appreciated that numerous variations to the invention have been contemplated as would be obvious to one of ordinary skill in the art with the benefit of this disclosure.

One embodiment may be comprised of a detachable tub. In such an embodiment, the tub bottom side bores may be generally sealed with a tub bottom plate which may slide over the bores and away from the bores to release the liquid from the tub into the tubes. In such an embodiment, the tub bottom plate may be a bore cover.

I claim:

1. A pet crate cooler comprising,
   a tub adapted to hold at least one of a liquid and a solid;
   a plurality of generally cylindrical tubes adapted to receive a liquid from the tub, each tube comprising a upper tube portion, a center tube portion, and a lower tube portion, each of the upper tube portion, center tube portion, and lower tube portion having generally equal diameters, the center tube portion comprising a greater exterior surface area than the upper tube portion and the lower tube portion;
   a fan; and
   a pet crate coupling mechanism.

2. The cooler of claim 1 wherein,
   the plurality of tubes comprise a tube array having a tube array inner side and a tube array outer side;
   the fan is adapted to move air from the tube array outer side to the tube array inner side;
   the solid comprises a frozen liquid adapted to melt at least at about room temperature; and
   the tub is further adapted to operatively lower the temperature of the tube liquid.

3. The cooler of claim 1 wherein,
   the tub is removably coupled to the tubes; and
   the tub bottom is further comprised of a bore cover.

4. The cooler of claim 1, wherein,
   the tub comprises a tub bottom and sides, the tub bottom having a plurality of bores.

5. The cooler of claim 1 wherein, the plurality of tubes (i) have a spacing between each tube, a distance of the spacing generally comprises a length less than the diameter of the each tube, and (ii) have an open top end, each tube having a longitudinal axis generally aligned with a tub bore longitudinal axis.

6. The cooler of claim 5 wherein,
   a one of a liquid and a solid is a tub liquid, the tub liquid adapted to mix with a tube liquid through the open tube top ends and the tub bore;
   the plurality of tubes comprising a tube array, the distance between the tubes in the tube array being less than the diameter of the tubes;
   the fan is adapted to blow air (i) around the tube array, (ii) through a pet crate door, and (iii) into a pet crate interior; and further comprising,
   a hook adapted to couple to the pet crate door.

7. A method of cooling a pet crate using the pet crate cooler of claim 1 comprising,
   hanging the pet crate cooler on a pet crate door;
   filling the plurality of tubes with a liquid;
   filling the tub with ice; and
   turning on the fan.

8. The method of claim 7 wherein,
   said hanging the pet crate cooler includes placing a hook onto a wire mesh; and further including,
   melting the ice;
   cooling the tube liquid by mixing the melted ice with the tube liquid; and
   lowering the temperature of a pet crate cavity by blowing air from a tube outer side to a tube inner side and into the pet crate.

9. The method of claim 8 wherein,
   said blowing air from a tube outer side to a tube inner side includes lowering the temperature of the air as it travels from the outer side to the inner side.

10. A method of cooling a pet crate comprising,
    coupling a pet crate cooler to a pet crate portal;
    placing ice into a pet crate cooler tub;
    closing the pet crate cooler door;
    turning on a pet crate cooler fan;
    decreasing the temperature of the pet crate cavity by blowing air from a tube outer surface to a tube inner surface and into a pet crate cavity;
    emptying the water from the tub; and
    placing new ice into the tub.

11. The method of claim 10 wherein,
    said coupling a pet crate cooler to a pet crate portal comprises hooking the pet crate cooler to a wire mesh door; and further including
    pouring water into an array of pet crate cooler tubes;
    melting the ice;

mixing the melted ice with the water poured into the array of pet crate cooler tubes; and coupling a fan on the pet crate cooler.

12. A combination comprising,
    a pet crate cooling device comprising,
        a plurality of hollow fins adapted to receive a liquid,
        an upper tub operatively adapted to cool a fin liquid,
        a lower tub adapted to receive a liquid;
    a fan;
    a pet crate comprised of a wire door; and
    an animal;
    wherein the fan is adapted to blow air between the plurality of hollow fins and through the wired door into a pet crate cavity.

13. The combination of claim 12 wherein,
    the plurality of fins are comprised of a vertical fins sequentially aligned;
    the upper tub may be adapted to cool the fin liquid by mixing a tub liquid with the fin liquid, and
    the fan is adapted to blow air between the sequentially aligned fins.

14. The combination of claim 12 further including,
    air direction barriers; and wherein,
    the plurality of fins comprise an open upper end and an open lower end;
        the open upper end adapted to receive liquid from the upper tub; and
        the open lower end adapted to operatively couple to a lower tub top surface.

15. A method of cooling the pet crate of claim 12 using the pet crate cooling device and fan of claim 13 comprising,
    coupling the pet crate cooler to the pet crate;
    moving air from a fin narrow end to a fin wide end and into a pet crate cavity;
    cooling the air; and
    lowering the temperature of the pet crate cavity.

16. The method of claim 15, further including,
    at least partially filling the hollow fins with water;
    placing ice in the upper tub;
    hanging the fan on a pet crate cooling device horizontal bar; and
    coupling the plurality of fins to the lower tub.

17. The method of claim 16 wherein,
    the animal is a dog; and further including,
    melting the ice;
    dispensing at least part of the water from the pet crate cooler; and
    replenishing the ice in the upper tub.

18. The method of claim 15, wherein,
    the pet crate cooler further includes air direction barriers; and further including, directing air from an air direction barrier towards the fins.

19. The method of claim 15 wherein, the fins are comprised of a closed fin lower end.

* * * * *